United States Patent [19]

Fleischman et al.

[11] Patent Number: 5,196,934

[45] Date of Patent: Mar. 23, 1993

[54] IMAGE SCALING APPARATUS FOR A MULTIMEDIA SYSTEM

[75] Inventors: Ross M. Fleischman, Boca Raton; Bruce J. Wilkie, West Palm Beach, both of Fla.

[73] Assignee: International Business Machines Corporation, Armonk, N.Y.

[21] Appl. No.: 650,388

[22] Filed: Feb. 1, 1991

[51] Int. Cl.⁵ .................................. H04N 5/262
[52] U.S. Cl. ................................ 358/160; 358/22
[58] Field of Search ............ 358/160, 180, 22, 451, 358/140; 340/731

[56] References Cited

U.S. PATENT DOCUMENTS 4,153,896  5/1979  White ............................. 340/731
4,302,776  11/1981  Taylor et al. .................... 358/160

OTHER PUBLICATIONS

Baxes, Gregory A. "Digital Image Processing", Prentice-Hall Inc. 1984, pp. 160-161.

Fant, "A Nonaliasing, Real-Time Spatial Transform Technique", IEEE Computer Graphics & Applications, vol. 6, No. 1, Jan. 1986.

Burkert et al., "IC Set For a Picture-In-Picture System With On-Chip Memory", IEEE Transactions of Consumer Electronics, vol. 36, No. 1, Feb. 1990.

Fleischman, "Design of a Dual-Video Display Device", Univ. of Florida 1986.

Primary Examiner—James J. Groody
Assistant Examiner—David E. Harvey
Attorney, Agent, or Firm—Stephen A. Terrile

[57] ABSTRACT

An apparatus for scaling an image as represented by an arrangement of picture elements. The apparatus scales the image from a first size to a second size based upon plurality of scaling parameters which represent a desired scaling factor. The apparatus includes a scaler circuit which receives the plurality of scaling parameters and an image signal representing the arrangement of picture elements. The scaler circuit manipulates the arrangement of picture elements based upon the plurality of scaling parameters to provide a manipulated arrangement of picture elements. The manipulation includes performing different operations on subsets of the picture elements based upon the plurality of scaling parameters. The operations include a drop operation, which omits a pixel which is received by the scaler circuit, a keep operation, which keeps a pixel which is received by the scaler circuit, a dual operation, which averages two pixels which are received by the scaler circuit, and a quad operation, which averages four pixels which are received by the scaler circuit. The scaler circuit provides the manipulated arrangement of picture elements as a scaled image.

28 Claims, 6 Drawing Sheets

IMAGE SCALING APPARATUS FOR A MULTIMEDIA SYSTEM

CROSS-REFERENCE TO RELATED APPLICATIONS

The present invention is related to U.S. Pat. application Ser. No. 07/625,564, filed Dec. 11, 1990 of John M. Dinwiddie, Jr., Bobby J. Freeman, Gustavo A. Suarez, and Bruce J. Wilkie, titled "Multimedia System", which application is hereby incorporated by reference.

BACKGROUND OF THE INVENTION

The present invention relates to multimedia computer systems, and more particularly, to scaling image signals which are used in multimedia computer systems.

Multimedia computer systems are information handling systems which combine the information handling characteristics of traditional computer systems with high quality video and audio presentations. The video presentation is provided by a video display device and the audio presentation is provided by an audio output device.

Multimedia computer systems include media sources which generate media signals. The media signals include audio signals, which are provided to the audio output device, and image signals, which are provided to the video display device. The image signals may include graphics signals, text signals, animation signals and full motion video signals. An image signal is converted to a video presentation by the display device, which receives the image signal and scans the image signal in a raster pattern across a screen of the display device. The speed with which the display device scans the image is called the sweep rate. The screen has a horizontal resolution and a vertical resolution which define display device screen coordinates. Each display device coordinate is a picture element (i.e., a pixel). The presentation from one complete scan of the screen is called a frame, or if the scans are interlaced, the presentation of one complete scan of the screen is called a field. To provide a full motion video presentation, a display device generates multiple frames per second.

It is often desirable to scale an image which is represented by an image signal so that the image may be presented on a portion of the screen of the display device (i.e., windowed on the screen). Scaling the image allows the image to be simultaneously presented with other images. An example of a system which would use a scaler is the multimedia system which is cross-referenced above.

It is known to scale an image by dropping pixels from the image signal. For example, Moore et al., U.S. Pat. No. 4,412,252, discloses a system in which dots along a line are deleted to reduce image width and lines are deleted to reduce image height. It is also known to scale an image by performing multiplication operations, using an image resampling sequencer circuit, on the image signal. For example, Eldon et al., "Using the TMC2301 Image Resampling Sequencer", *TRW LSI Products* discloses such a system.

SUMMARY OF THE INVENTION

It has been discovered that by providing a scaling apparatus which receives an arrangement of picture elements and performs a plurality of operations on the picture elements in response to predefined scaling parameters, an image may be efficiently scaled in real time (i.e., at the image refresh rate) via a low complexity hardware implementation.

BRIEF DESCRIPTION OF THE DRAWINGS

FIG. 2 shows a block diagram of a horizontal component scaling circuit of the FIG. 1 scaling apparatus, the vertical scaling circuit being similar.

DETAILED DESCRIPTION

Figure 1:
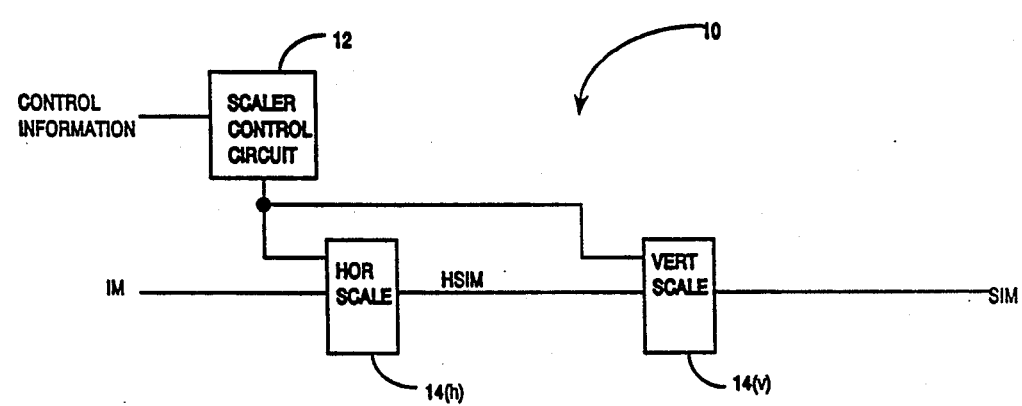
FIG. 1 shows a block diagram of a scaling apparatus according to the present invention.

Referring to FIG. 1, scaling apparatus 10, which scales a monochromatic image signal (IM), includes scaler control circuit 12 as well as horizontal component scaling circuit 14($h$) and vertical component scaling circuit 14($v$) (referred to generally as component scaling circuit 14). Scaler control circuit 12 receives control information and provides scaling control signals. The scaling control signals include scaling parameters which are based upon a desired scaling factor; the scaling parameters are generated, e.g., via a look-up table. The control information includes information indicative of the desired scaling factor as well as timing information. Scaler control circuit 12 provides scaling parameters that correspond to the scaling factors to horizontal component scaling circuit 14($h$) and vertical component scaling circuit 14($h$) as part of the control information. Horizontal scaling circuit 14($h$) also receives the IM image signal, which includes an arrangement of pixels of an image to be scaled. The arrangement includes rows and columns of pixels. Horizontal scaling circuit 14($h$) manipulates rows of the IM signal by performing a plurality of operations on the IM signal based upon the scaling parameters and provides an intermediate horizontally scaled image signal (HSIM) to vertical component scaling circuit 4($v$). Vertical component scaling circuit 14($v$) receives the HSIM signal, manipulates columns of pixels in the HSIM signal by performing a plurality of operations on the HSIM signal based upon the scaling parameters and provides a scaled image signal (SIM) which represents a manipulated arrangement of pixels. The manipulated arrangement of pixels correspond to a scaled representation of the IM signal.

Figure 2:
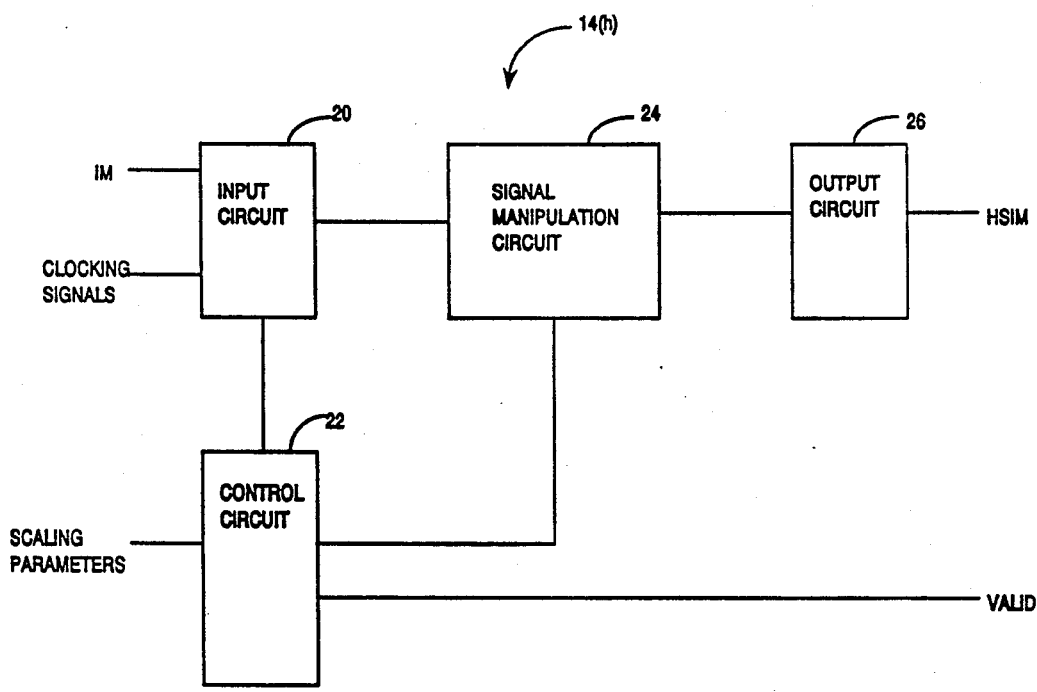

Referring to FIG. 2, horizontal component scaling circuit 14($h$) includes: input circuit 20, which receives and synchronizes the image signal to be scaled as well as clock signals related to the image signal; control circuit 22, which receives the scaling parameters from scaler control circuit 12 and clock signals from input circuit 20 and generates signal manipulation control signals; signal manipulation circuit 24, which manipulates the synchronized image signal based upon signal manipulation control signals which are provided by control circuit 22; and, output circuit 26, which appropriately conditions the scaled image signal to provide the proper format for output. Output circuit 26 of horizontal component scaling circuit 14(h) includes drivers to drive the horizontally scaled image signal to vertical component scaling circuit 14(v).

Vertical component scaling circuit 14(v) is architecturally similar to horizontal component scaling circuit 14(h). However, output circuit 26 of vertical converter (not shown) so that the scaled image signal is in the proper format for display.

Figure 3:
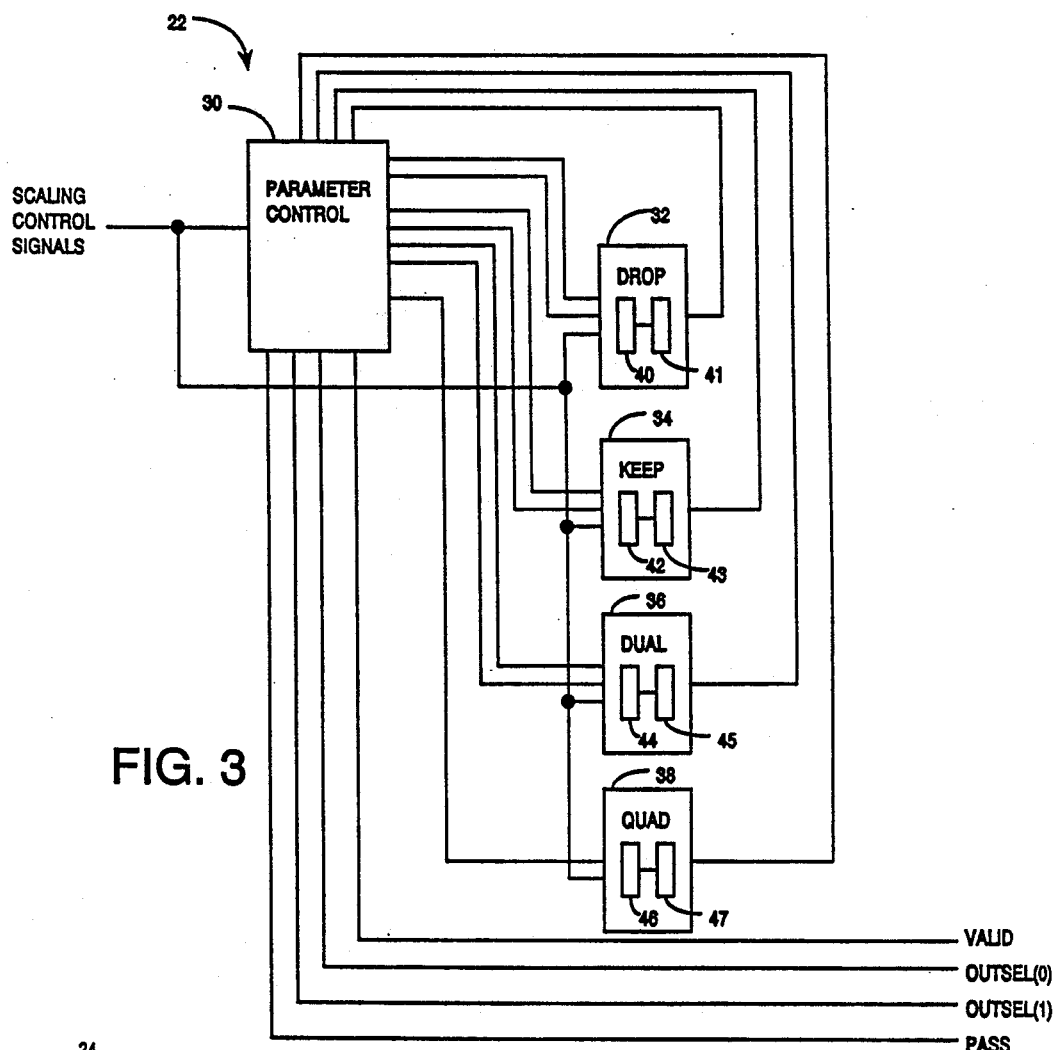
FIG. 3 shows a block diagram of the control circuit of the FIG. 2 component scaling circuit.

Referring to FIG. 3, control circuit 22 includes parameter control circuit 30, which receives a plurality of scaling control signals from scaler control circuit 12 as input control signals. These input control signals include a pixel clock signal (PIXEL CLK), a load register signal (IOW), an enable signal (F), which enables a read or write signal based upon a decode of the load address, two address select bits (A0 and A1), which represent the least significant bits of the load address, and a blanking signal (BLNK), which is a timing signal which indicates when the display device is in its retrace interval. Control circuit 22 also includes drop circuit 32, keep circuit 34, dual circuit 36 and quad circuit 38, which receive a drop control signal (DROP), a keep control signal (KEEP), a dual control signal (DUAL) and a quad control signal (QUAD), respectively, as well as the PIXEL CLK signal from control circuit 12. The DROP, KEEP, DUAL, and QUAD signals are the scaling parameters which are provided by scaler control circuit 12. Drop circuit 32 includes drop register 40 and drop counter 41. Keep circuit 34 includes keep register 42 and keep counter 43. Dual circuit 36 includes dual register 44 and dual counter 45. Quad circuit 38 includes quad register 46 and quad counter 47. Each register 40, 42, 44, 46 is a conventional 8-bit register. Each counter 41, 43, 45, 47 is a conventional loadable 8-bit down counter.

Drop circuit 32 provides an 8-bit drop count signal (DROP CNT) as well as a drop feedback signal (DROPZ), which indicates when the DROP CNT signal equals zero, as input control signals to parameter control circuit 30. Keep circuit 34 provides an 8-bit keep count signal (KEEP CNT) as well as a keep feedback control signal (KEEPZ), which indicates when the KEEP CNT signal equals zero, as input control signals to parameter control circuit 30. Dual circuit 36 provides an 8-bit dual count signal (DUAL CNT) as well as a dual feedback control signal (DUALZ), which indicates when the DUAL CNT signal equals zero, as input control signals to parameter control circuit 30. Quad circuit 38 provides a quad feedback control signal (QUADZ), which indicates when the count which is provided by the counter portion of quad circuit 38 equals zero, as input control signals to parameter control circuit 30.

Parameter control circuit 30 provides a plurality of output signals including a counter initialization signal (INITCTR), which is provided to the counters 41, 43, 45, 47 of drop circuit 32, keep circuit 34, dual circuit 36 and quad circuit 38. Other output signals provided by parameter control circuit 30 include a load drop register signal (LDDR) and a decrement drop counter signal (DECDC), which are provided to drop circuit 32, a load keep register signal (LDKR) and a decrement keep counter signal (DECKC), which are provided to keep circuit 32, a load dual register (LDDAR) and a decrement dual counter signal (DECDAC), which are provided to dual circuit 34, and a load quad register (LDQAR) and a decrement quad counter signal (DECQAC), which are provided to quad circuit 36. Parameter control circuit 30 also provides a plurality of signal manipulation output control signals including a pass indication signal (PASS), which indicates when to allow a pixel to flow through signal manipulation circuit 24, a 2-bit out select signal (OUTSEL), which controls manipulation of a signal by signal manipulation circuit 24, and a valid output pixel signal (VALID), which indicates when the next stage to which the scaled image signal is provided may read the scaled image signal.

Parameter control circuit 30 includes a plurality of programmable array logic integrated circuits (PALs) which provide the output signals based upon the input signals. The PALs are programmed with PAL equations; each PAL equation corresponds to circuitry which generates a particular output signal. For PAL equations, a "/" indicates an inversion, a "=" indicates an asynchronous equals, and a ":=" indicates a signal which is synchronized by a flip flop which is clocked by the PIXEL CLK signal. More specifically, the PAL equation for the INITCTR signal is:

```
INITCNT = (BLNK AND /A AND /B) OR (DROP1 AND KEEPZ
AND DUALZ AND QUADZ AND /A AND /B) OR (DROPZ AND
KEEP1 AND DUALZ AND QUADZ AND /A AND /B) OR (DROPZ
AND KEEPZ AND DUALZ AND QUADZ AND /A AND /B) OR
(DUAL1 AND QUADZ AND /A AND B) OR (QUADZ AND A AND
/B);
    where,
        DROP1 = /DROP CNT(7) AND /DROP CNT(6) AND /DROP
        CNT(5) AND /DROP CNT(4) AND /DROP CNT(3) AND /DROP
        CNT(2) AND /DROP CNT(1) AND DROP CNT(0);
        KEEP1 = /KEEP CNT(7) AND /KEEP CNT(6) AND /KEEP
        CNT(5) AND /KEEP CNT(4) AND /KEEP CNT(3) AND /KEEP
        CNT(2) AND /KEEP CNT(1) AND KEEP CNT(0);
        DUAL1 = /DUAL CNT(7) AND /DUAL CNT(6) AND /DUAL
        CNT(5) AND /DUAL CNT(4) AND /DUAL CNT(3) AND /DUAL
        CNT(2) AND /DUAL CNT(1) AND DUAL CNT(0);
        A := B AND DUALZ AND /QUADZ;
    and,
        B := (DUALZ AND /QUADZ AND /A AND B) OR (/BLNK AND
        DROPZ AND KEEPZ AND /DUALZ AND /A AND /B) OR
        (/BLNK AND DROPZ AND KEEPZ AND /QUADZ AND /A AND
        /B).
```

-continued

The PAL equation for the LDDR signal is:
    LDDR = IOW AND F AND A1 AND A0.
The PAL equation for the DECDC signal is:
    DECDC = /BLNK AND /DROPZ AND /A AND /B,
where A and B are defined above. The PAL equation for the LDKR signal is:
    LDKR = IOW AND F AND A1 AND /A0.
The PAL equation for the DECKC signal is:
    DECKC = /BLNK AND /KEEPZ AND DROPZ AND /A AND /B,
where A and B are described above. The PAL equation for the LDDAR signal is:
    LDDAR = IOW AND F AND /A1 AND A0.
The PAL equation for the DECDAC signal is:
    DECDAC = /A AND B AND /DUALZ,
where A and B are described above. The PAL equation for the LDQAR signal is:
    LDQAR = IOW AND F AND /A1 AND /A0.

The PAL equation for the LDDR signal is:

LDDR=IOW AND F AND A1 AND A0.

The PAL equation for the DECDC signal is:

DECDC=/BLNK AND /DROPZ AND /A AND /B, where A and B are defined above. The PAL equation for the LDKR signal is:

LDKR=IOW AND F AND A1 AND /A0.

The PAL equation for the DECKC signal is:

DECKC=/BLNK AND /KEEPZ AND DROPZ AND /A AND /B, where A and B are described above. The PAL equation for the LDDAR signal is:

LDDAR=IOW AND F AND /AI AND A0.

The PAL equation for the DECDAC signal is:

DECDAC=/A AND B AND /DUALZ, where A and B are described above. The PAL equation for the LDQAR signal is:

LDQAR=IOW AND F AND /AI AND /A0.

The PAL equation for the DECQAC signal is:

DECQAC=A AND B, where A and B are described above.

PALs also control generating the signal manipulation control signals. Accordingly, the PAL equation for the PASS signal is:

PASS=A AND B.

The PAL equation for the OUTSEL(1) signal is:

OUTSEL(1)=A AND /B.

The PAL equation for the OUTSEL(2) signal is:

OUTSEL(2)=/A AND B AND /DUALZ.

VALID :=A AND /B OR /DUALZ AND /A AND /B OR /BLNK AND DROPZ AND /KEEPZ AND /A AND /B.

Control circuit 22 works in conjunction with signal manipulation circuit 24 based upon the states of the signal manipulation control signals and the clock signals.

Figure 4:
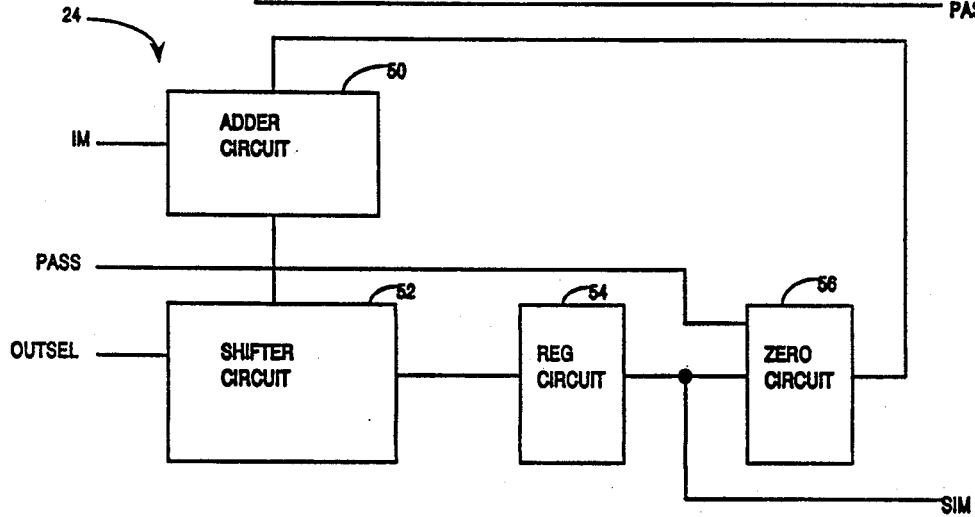
FIG. 4 shows a block diagram of the signal manipulation circuit of the FIG. 2 component scaling circuit.

Referring to FIG. 4, signal manipulation circuit 24 includes: adder circuit 50, which receives the synchronized IM signal; shifter circuit 52, which receives an output from adder circuit 50 as well the OUTSEL control signal from parameter control circuit 30 of control circuit 22; register circuit 54, which receives the output signal from shifter circuit 52 as well as the PIXEL CLK clock signal; and, zeroing circuit 56, which receives the synchronized output signal from register circuit 54 as well as the PASS control signal. Zeroing circuit 56 provides a second input to adder circuit 50.

Referring to FIG. 1, in operation, scaler control circuit 12 receives control information which indicates the desired ratio by which an image should be scaled (i.e., a scaling factor). Scaler control circuit 12 provides four scaling parameters, a drop parameter, a keep parameter, a dual parameter and a quad parameter, to component scaling circuits 14(h) and 14(v) based upon the scaling factor desired. For example, if the reduction desired is ⅔ of the original image, the scaling parameters are DROP=0, KEEP=2, DUAL=1 and QUAD=0. If the reduction desired is 1/5 of the original image, the scaling parameters are DROP=1, KEEP=0, DUAL=0 and QUAD=1. If the reduction desired is ⅖ of the original image, the scaling parameters are DROP=0, KEEP=1, DUAL=1, and QUAD=0. Component scaling circuits 14 also receive the IM signal, which represents an arrangement of pixels of an image, on a pixel by pixel basis. Horizontal component scaling circuit 14(h) receives the IM signal, horizontally scales this signal, and provides the horizontally scaled image signal HIM to vertical component scaling circuit 14(v). Vertical component scaling circuit 14(v) receives the horizontally scaled image signal and vertically scales this signal to provide the scaled image signal SIM, which represents a manipulated arrangement of pixels.

Each component scaling circuit 14 scales along an axis of the arrangement of pixels by performing a combination of four operations on the pixels of that axis; horizontal component scaling circuit 14(h) scales the abscissa and vertical component scaling circuit scales the ordinate. The operations include a drop operation, a keep operation, a dual operation and a quad operation. With a drop operation, component scaling circuit 14 omits a pixel which is received by component scaling circuit 14. With a keep operation, component scaling circuit 14 keeps a pixel which is received by component scaling circuit 14. With a dual operation, component scaling circuit 14 averages two pixels which are received by component scaling circuit 14. With a quad operation, component scaling circuit 14 averages four pixels which are received by component scaling circuit 14. Combinations of these four operations can represent any reduction. The frequency with which the operations are performed corresponds to the four scaling parameters.

Figure 5:
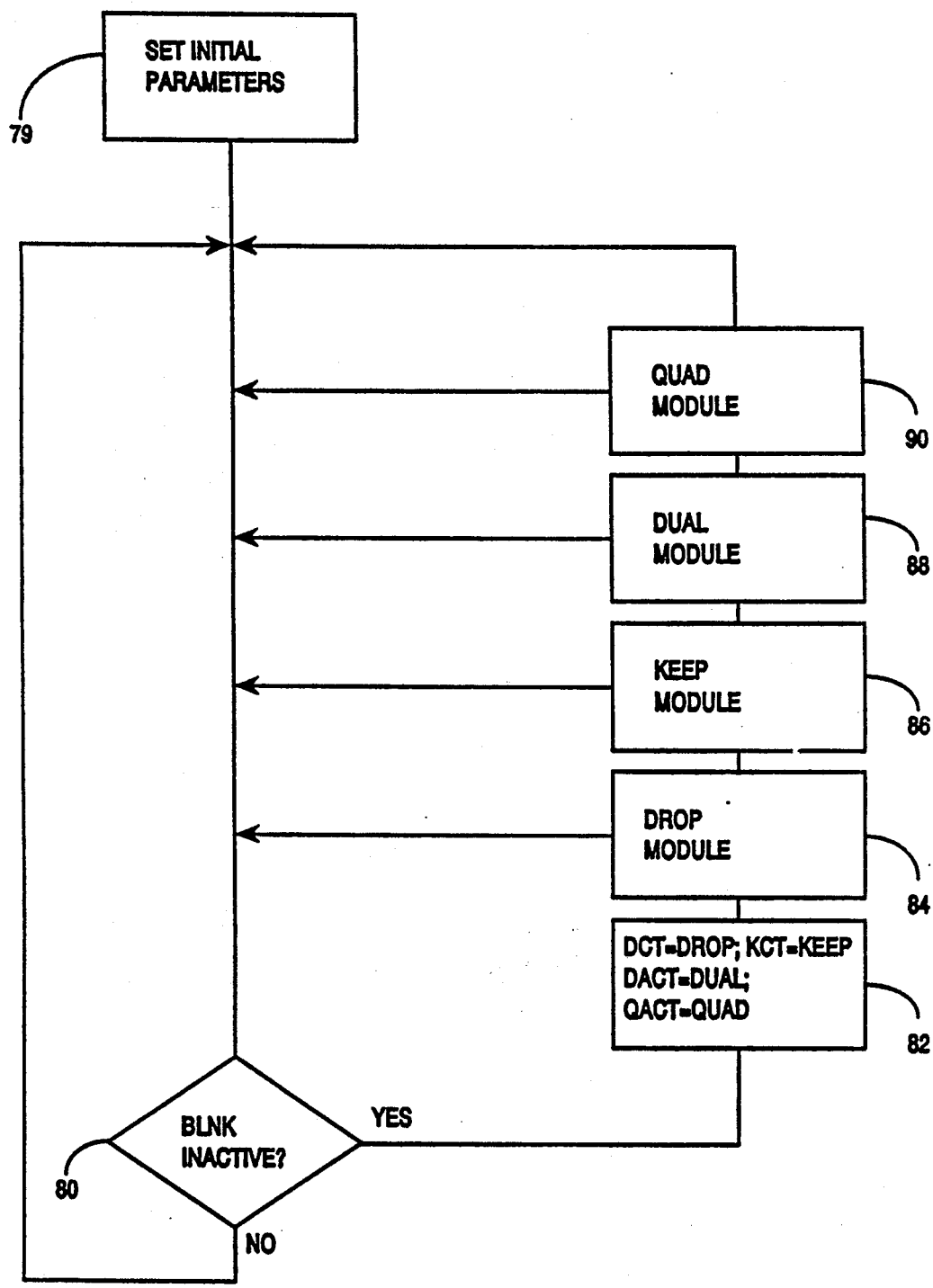
FIG. 5 shows a flow chart of the operation of the FIG. 2 scaling apparatus.

More specifically, referring to FIGS. 1 and 5, when scaling the horizontal axis of the image, horizontal component scaling circuit 14(h) is activated by scaler control circuit 12. Registers 40, 42, 44, 46 are loaded with the drop, keep, dual and quad parameters, respectively, as set initial parameters block 79. More specifically, the drop parameter is loaded into register 40 as the DROP COUNT signal when the LDDR signal is active. The keep parameter is loaded into register 42 as the KEEP COUNT signal when the LDKR signal is active. The dual parameter is loaded into register 44 as the DUAL COUNT signal when the LDDAR signal is active. The quad parameter is loaded into register 46 as the QUAD COUNT signal when the LDQAR signal is active. Control is then passed to blanking signal review block 80.

When the BLNK signal becomes inactive, as determined by blanking signal review block 80, control is passed to load parameters block 82. In load parameters block 82, the drop, keep, dual, and quad parameters are loaded into counters 41, 43, 45, 47, respectively. When an active INITCNT signal is provided by control circuit 22. Once the scaling parameters are loaded into the counters, component scaling circuit 14(h) is ready to begin scaling the image. If the BLNK signal is active, indicating that the display device scan is inactive, then component scaling circuit 14(h) goes into a wait state, i.e., loops, until the BLNK signal becomes inactive.

After counters 41, 43, 45, 47 are loaded, control is passed to drop module 84. From drop module 84, control is either passed to keep module 86 or is returned to blanking signal review block 80. From keep module 86, control is either passed to dual module 88 or is returned to blanking signal review block 80. From dual module 88, control is either passed to quad module 90 or is returned to blanking signal review block 80. From quad module 90, control is returned to blanking signal review block 80.

Figure 6:
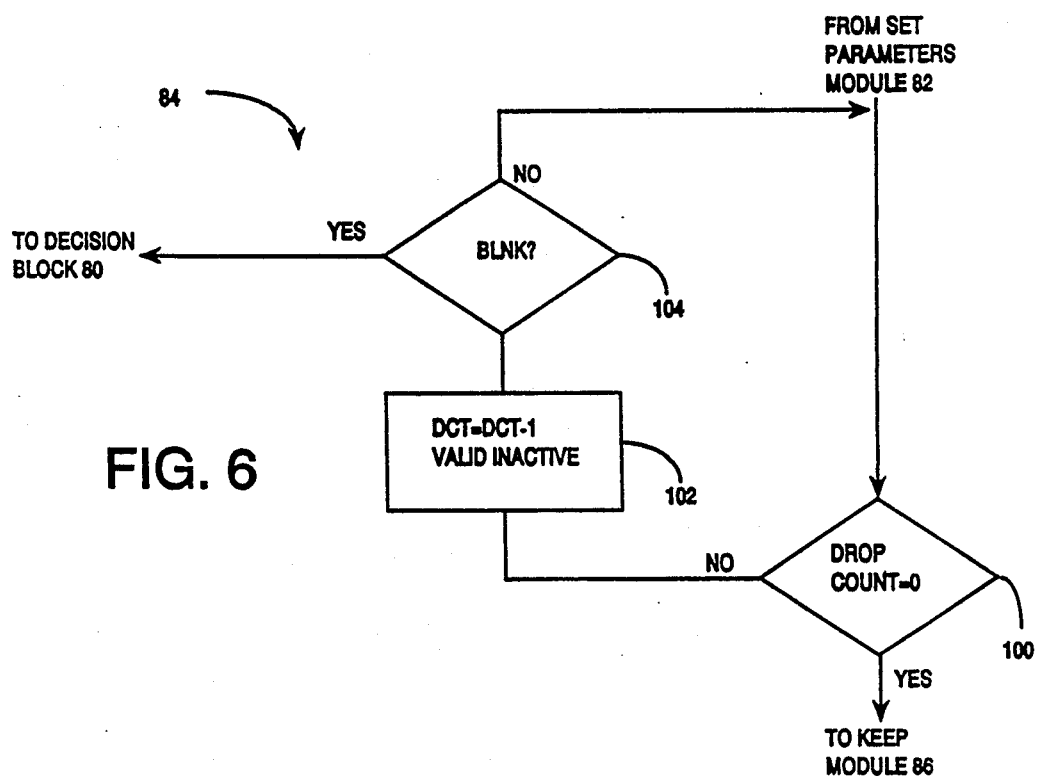
FIG. 6 shows a flow chart of the operation of the drop module of the FIG. 2 apparatus.

More specifically, referring to FIGS. 3 and 6, when control is passed to drop module 84, drop module 84 first determines, at drop count decision block 100, whether DROP COUNT is equal to zero. If DROP COUNT is equal to zero, indicating that a drop pixel operation should not occur, then control is passed to keep module 86.

If DROP COUNT is not equal to zero, indicating that a drop pixel operation should occur, then control is passed to perform drop operation block 102. At perform drop operation block 102, parameter control circuit 30 provides an active DECDC signal to counter 41, thus causing counter 41 to decrement the DROP COUNT signal, parameter control circuit 30 sets the VALID signal inactive and the pixel counter is set to the next pixel of the IM signal. When an inactive VALID signal is provided by control circuit 22, the pixel is effectively dropped because the pixel is not read by the next stage before the next pixel is provided to component scaler circuit 14. Signal manipulation circuit 24 does not perform an operation on the pixel when a pixel is dropped.

Perform drop operation block 102 passes control to blanking review block 104, which determines whether the BLNK signal is active. If the BLNK signal is active, control leaves drop module 84 and is returned to blanking signal review block 80. If the BLNK signal is inactive, then control is passed to drop count decision block 100. If the DROP COUNT signal now equals zero, then control is passed to keep module 86, otherwise control is passed to perform drop operation block 102.

Figure 7:
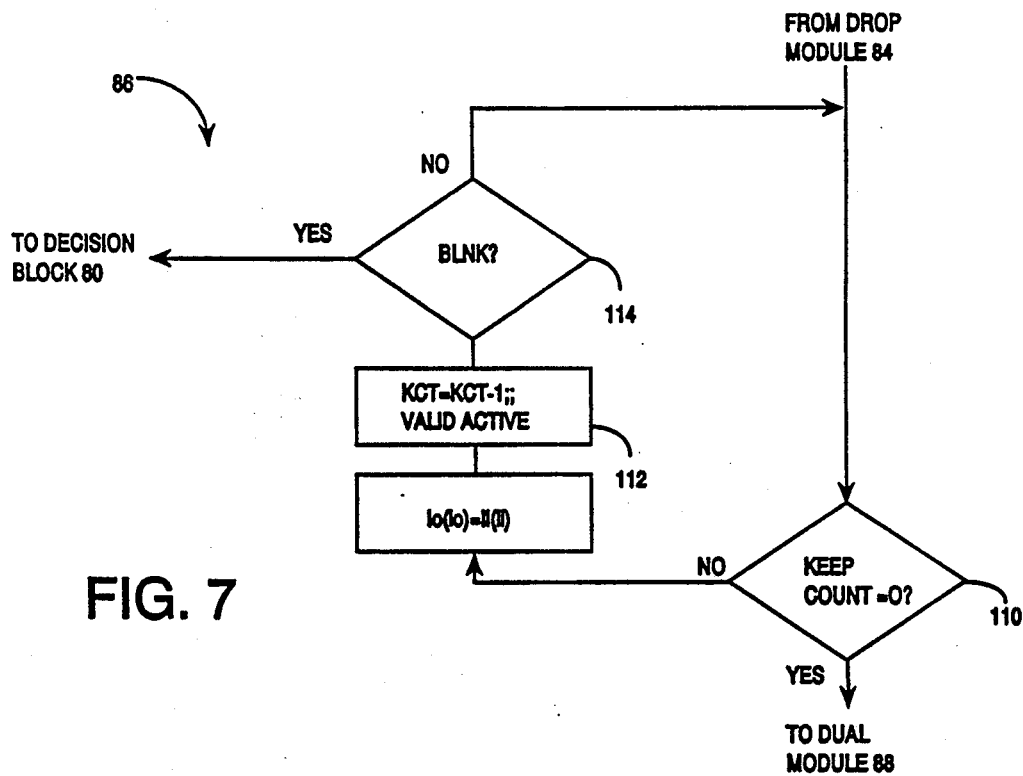
FIG. 7 shows a flow chart of the operation of the keep module of the FIG. 2 apparatus.

Referring to FIGS. 3, 4 and 7, when control is passed to keep module 86, keep module 86 first determines, at keep count decision block 110, whether KEEP COUNT is equal to zero. If KEEP COUNT is equal to zero, indicating that a keep operation should not be performed, then control is passed to dual module 88.

If KEEP COUNT is not equal to zero, indicating that a keep pixel operation should occur, then control is passed to perform keep operation block 112. At perform keep operation block 112, parameter control circuit 30 provides an active DECKC signal to counter 43, thus causing counter 43 to decrement the KEEP COUNT signal and parameter control circuit 30 to set the PASS signal active and the VALID signal active. When an active VALID signal is provided by output circuit 26 in conjunction with an active PASS signal, the pixel is effectively kept because the pixel is read by the next stage before the next pixel is provided to component scaler circuit 14.

In signal manipulation circuit 24 when a pixel is kept, the pixel which is provided to adder circuit 50 as the first adder input signal is added to zero, which is provided by zero circuit 56 as the second adder input signal when the PASS signal is active. The output signal of adder circuit 50 is provided to register circuit 54 where it is provided as an output when the VALID signal becomes active.

Control is passed from keep operation block 112 to blanking review block 114, which determines whether the BLNK signal is active. If the BLNK signal is active, control is returned to blanking signal review block 80. If the BLNK signal is inactive, control is passed to keep count decision block 110. If the KEEP COUNT signal now equals zero, then control is passed to dual module 88, otherwise control is passed to perform keep operation block 112.

Figure 8:
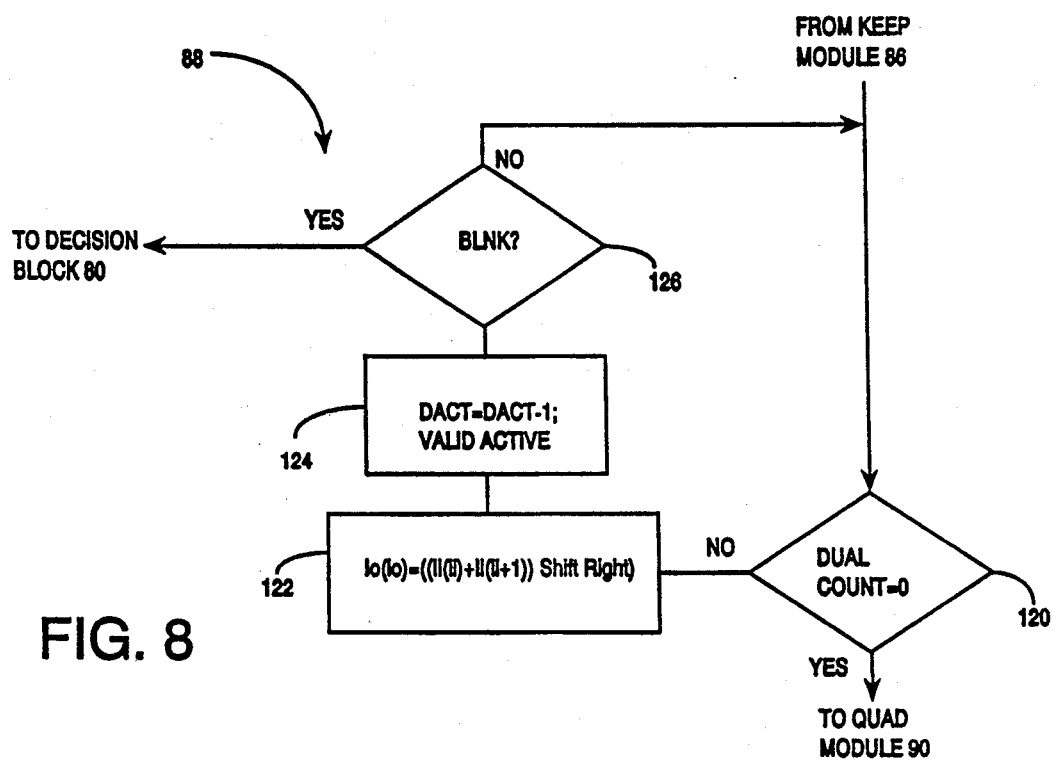
FIG. 8 shows a flow chart of the operation of the dual module of the FIG. 2 apparatus.

Referring to FIG. 8, when control is passed to dual module 88, dual module 88 first determines, at dual count decision block 120, whether the DUAL COUNT signal is equal to zero. If the DUAL COUNT signal equals zero, indicating that a dual operation should not be performed then control is passed to quad module 90.

If the DUAL COUNT signal does not equal zero, indicating that a dual pixel operation should occur, then control is passed to perform shift right block 122. At shift right block 122, two consecutive input pixels are added and the sum is shifted right, thus averaging the two pixels. Shift right block 122 then passes control to keep advance block 124. In keep advance block 124, parameter control circuit 30 provides an active DECDAC signal, thus decrementing the DUAL COUNT signal, and sets the VALID signal active. When an active VALID signal is provided by output circuit 26, the averaged pixel is read by the next stage.

Signal manipulation circuit 24 manipulates the input pixels when the shift right portion of the dual operation is performed. More specifically, a first pixel is provided to adder circuit 50, passed through adder circuit 50 and shifter circuit 52 and is stored in register circuit 54. A second consecutive pixel is provided to adder circuit 50. Because the PASS signal is inactive, the first pixel, which is stored in register circuit 54, is passed through zero circuit 56 and provided to adder circuit 50 as the second adder input signal. Adder circuit 50 adds the two pixels and provides the sum to shifter circuit 52. Based upon the state of the OUTSEL signal, shifter circuit shifts the sum right one bit, thus effectively dividing by two. However, any remainder from the shift is discarded.

Dual advance block 124 passes control to blanking review block 126, which determines whether the BLNK signal is active. If the BLNK signal is active, control is returned to blanking signal review block 80. If the BLNK signal is inactive, control is passed to dual count decision block 120. If the DUAL COUNT signal now equals zero, then control is passed to quad module 90, otherwise, control is passed to perform shift right block 122.

Figure 9:
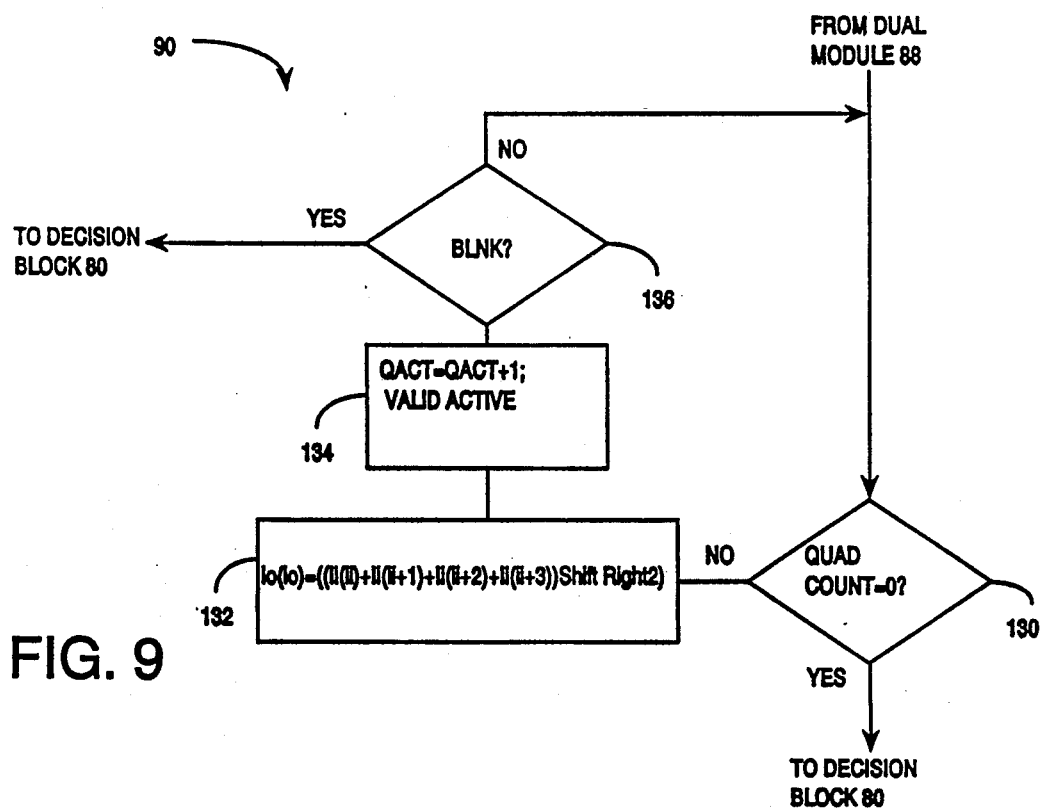
FIG. 9 shows a flow chart of the operation of the quad module of the FIG. 2 apparatus.

Referring to FIGS. 3, 4 and 9, when control is passed to quad module 90, quad module 90 first determines, at quad count decision block 130, whether the QUAD COUNT signal equals zero. If the QUAD COUNT signal equals zero, indicating that a quad operation should not be performed, then control is passed to blanking signal review block 80.

If the QUAD COUNT signal does not equal zero, indicating that a quad pixel operation should be performed, then control is passed to perform shift right two block 132. At shift right two block 132, four consecutive input pixels are added and the sum is shifted right two bits, thus averaging the four pixels. Shift right two block 132 then passes control to quad advance block 134. In quad advance block 134, parameter control circuit 30 provides an active DECQAC signal, thus decrementing the QUAD COUNT signal, and sets the VALID signal active. When an active VALID signal is provided by output circuit 26, the averaged pixel is read by the next stage.

Signal manipulation circuit 24 manipulates the input pixels during the shift right two portion of the quad operation. More specifically, a first pixel is provided to adder circuit 50, passed through adder circuit 50 and shifter circuit 52 and is stored in register circuit 54. A second consecutive pixel is provided to adder circuit 50. Because the PASS signal is inactive, the first pixel, which is stored in register circuit 54, is passed through zero circuit 56 and provided to adder circuit 50 as the second adder input signal. Adder circuit 50 adds the two pixels and provides the sum to shifter circuit 52. Based upon the state of the OUTSEL signal, shifter circuit passes the sum to register circuit 54. Because the PASS signal is inactive, the sum of the first two pixels, which is stored in register circuit 54, is passed through zero circuit 56 and provided to adder circuit 50 as the second adder input signal. Adder circuit 50 adds the sum of the first two pixels with the third pixel and provides the sum to shifter circuit 52. Based upon the state of the OUTSEL signal, shifter circuit passes the sum to register circuit 54. Because the PASS signal is inactive, the sum of the first three pixels, which is stored in register circuit 54, is passed through zero circuit 56 and provided to adder circuit 50 as the second adder input signal. Adder circuit 50 adds the sum of the first three pixels with the forth pixel and provides the sum to shifter circuit 52. Based upon the state of the OUTSEL signal, shifter circuit shifts the sum of the four pixels to the right two bits, thus effectively dividing the sum of the four pixels by four, and averaging the four pixels. The result of this operation is stored in register circuit 54, from where this result is read when the VALID signal goes active. However, any remainder from the shift is discarded.

Quad advance block 124 passes control to blanking review block 126, which determines whether the BLNK signal is active. If the BLNK signal is active, control is returned to blanking signal review block 80. If the BLNK signal is inactive, control is passed to quad count decision block 120. If the QUAD COUNT signal now equals zero, then control is passed to blanking signal review block 80, otherwise control is passed to perform shift right block 122.

When control is passed to blanking signal review block 80, if the BLNK signal is still inactive, then control is passed to load parameters block 82. When the BLNK signal goes active, indicating that a horizontal scan line has been completed, then horizontal component scaling circuit 14($h$) goes into a wait state until the BLNK signal again becomes inactive, indicating that the next line in the arrangement of pixels is being presented to horizontal component scaler circuit 14($h$).

Referring again to FIG. 1, horizontal component scaling circuit 14($h$) provides the horizontally scaled image, as represented by the HSIM signal, to vertical component scaling circuit 14($v$), which vertically scales the image simultaneously with the horizontal scaling. More specifically, input circuit 20 of vertical component scaling circuit 14($v$) receives the HSIM signal from horizontal component scaling circuit 14($h$). Input circuit 20 of vertical component scaling circuit 14($v$) stores the HSIM signal as lines of pixels which correspond to lines of the presentation. When enough lines have been stored to manipulate pixels along the ordinate, then signal manipulation circuit 24 and control circuit 22 manipulate the pixels. The manipulated pixels are provided to output circuit 26 of vertical component scaling circuit 14($v$), where the manipulated pixels are assembled in a memory to provide a frame of the scaled presentation. When the frame is fully assembled as indicated by a vertical blanking signal, then the scaled output signal SIM is provided to a display device where the scaled image is presented.

Other Embodiments

Other embodiments are within the following claims.

Figure 10:
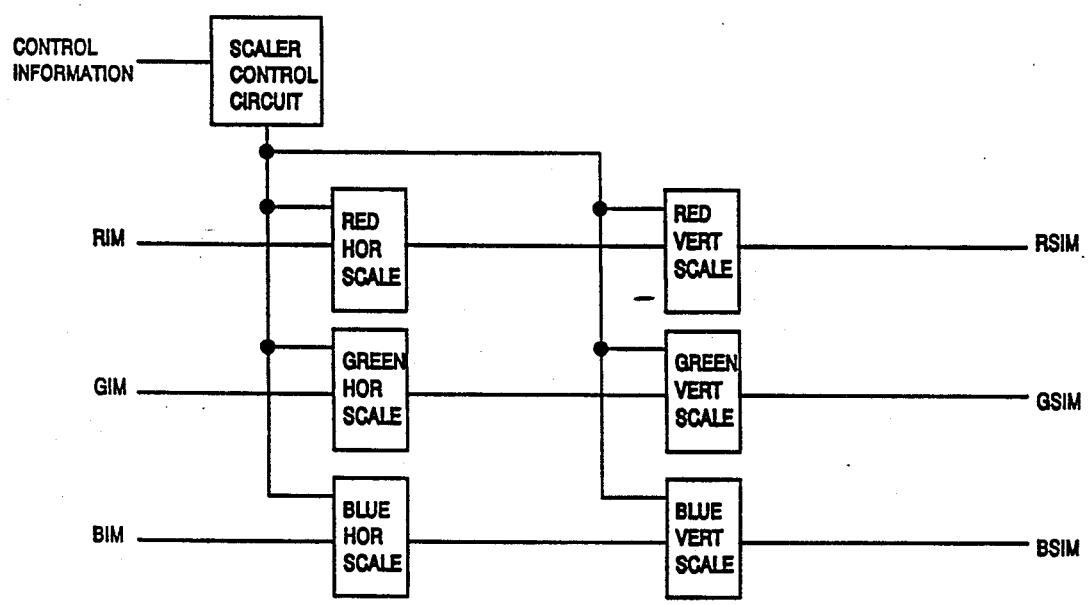
FIG. 10 shows an alternate embodiment of a scaling apparatus which is in accordance with the present invention.

For example, FIG. 10 shows an alternate scaler circuit which may be used to scale color images.

Also, for example, while a hardware implementation is set forth as the preferred embodiment of a scaler according the present invention, a scaler according to the present invention can be embodied in software which implements the methods described in the flow charts of FIGS. 5-9.

What is claimed is:

1. An apparatus for scaling an image as represented by an arrangement of picture elements comprising
   a scaler control circuit configured to provide a plurality of scaling parameters based upon a desired scaling factor,
   said plurality of scaling parameters being integer numbers, and a scaler circuit,
said scaler circuit including a plurality of separate parameter counter circuits, each said parameter counter circuit receiving a respective scaling parameter and providing a respective signal manipulation control signal based upon said respective scaling parameter,
said scaler circuit being configured to
receive said arrangement of picture elements,
manipulate said arrangement of picture elements based upon said signal manipulation control signals to provide a manipulated arrangement of picture elements,
said manipulation including performing a discrete number of different operations on subsets of said arrangement of picture elements based upon said respective signal manipulation control signals, as discrete number of different operations being selectively enabled based upon said signal manipulation control signals, and
provide said manipulated arrangement of picture elements as a scaled image.

2. The apparatus of claim 1 wherein
said scaler circuit includes
a control circuit,
said control circuit being configured to receive said plurality of scaling parameters and to provide said signal manipulation control signals based upon said plurality of scaling parameters, said control circuit including said plurality of parameter counter circuits, and
a signal manipulation circuit,
said signal manipulation circuit being configured to manipulate said arrangement of picture elements in response to said signal manipulation control signals.

3. An apparatus for scaling an image as represented by an arrangement of picture elements comprising
a scaler control circuit configured to provide a plurality of scaling parameters based upon a desired scaling factor,
said plurality of scaling parameters being integer numbers, and
a scaler circuit, said scaler circuit being configured to receive said plurality of scaling parameters and said arrangement of picture elements, manipulate said arrangement of picture elements based upon said plurality of scaling parameters to provide a manipulated arrangement of picture elements, said manipulation including performing a discrete number of different operations on subsets of said arrangement of picture elements, said discrete number being related to said plurality of scaling parameters, and provide said manipulated arrangement of picture elements as a scaled image
said scaler circuit including
a control circuit, said control circuit being configured to receive said plurality of scaling parameters and to provide signal manipulation control signals based upon said plurality of scaling parameters, and
a signal manipulation circuit, said signal manipulation circuit being configured to manipulate said arrangement of picture elements in response to said signal manipulation control signals
said control circuit including
a parameter counter circuit, said parameter counter circuit being configured to receive a scaling parameter and to provide a parameter count signal and a parameter count equals zero control signal, and
a parameter control circuit, said parameter control circuit being configured to receive input control signals including said parameter counter signal and said parameter count equals zero control signal from said parameter counter circuit as well as a timing control signal and a scaling enable signal, to provide said signal manipulation control signals based upon said input control signals and to provide said timing control signal to said parameter counter circuit.

4. The apparatus of claim 3 wherein
said control circuit includes a plurality of parameter counter circuits,
said plurality of parameter counter circuits providing a plurality of parameter count signals and a plurality of parameter count equals zero signals to said parameter control circuit based upon said plurality of scaling parameters and said timing control signal, and
said parameter control circuit is configured to receive said plurality of parameter count signals and said plurality of parameter count equals zero signals as input control signals.

5. The apparatus of claim 4 wherein
said parameter counter circuit is a drop circuit,
said drop circuit being configured to receive a drop scaling parameter and to provide a drop count signal as well as a drop count equals zero control signal to said parameter control circuit.

6. The apparatus of claim 4 wherein
said parameter counter circuit is a keep circuit,
said keep circuit being configured to receive a keep scaling parameter and to provide a keep count signal as well as a keep count equals zero control signal to said parameter control circuit.

7. The apparatus of claim 4 wherein
said parameter counter circuit is a dual circuit,
said dual circuit being configured to receive a dual scaling parameter and to provide a dual count signal as well as a dual count equals zero control signal to said parameter control circuit.

8. The apparatus of claim 4 wherein
said parameter counter circuit is a quad circuit,
said quad circuit being configured to receive a quad scaling parameter and to provide a quad count signal as well as a quad count equals zero control signal to said parameter control circuit.

9. The apparatus of claim 2 wherein
said signal manipulation circuit includes
an adder circuit,
said adder circuit being configured to receive said image signal as a first adder input signal and to provide an adder output signal, and
a shifter circuit,
said shifter circuit being configured to receive said adder output signal and a first signal manipulation control signal and to provide a shifter output signal,
said shifter output signal corresponding to a second adder input signal,
said adder output signal corresponding to the sum of said first adder input signal and said second adder input signal.

10. The apparatus of claim 9 wherein
said signal manipulation circuit further includes
a register circuit, said register circuit being configured to receive said shifter output signal and to provide a synchronized shifter output signal, and a zero circuit, said zero circuit being configured to receive said synchronized shifter output signal and a second signal manipulation control signal and to provide said second adder input signal based upon said second signal manipulation control signal.

11. The apparatus of claim 2 wherein
said scaler circuit further includes
an input circuit,
said input circuit being configured to receive an image signal representing said arrangement of picture elements, and
an output circuit,
said output circuit being configured to provide said manipulated arrangement of picture elements as a scaled image signal.

12. The apparatus of claim 1 wherein
said different operations include a drop operation,
said drop operation removing a picture element from said arrangement of picture elements when providing said manipulated arrangement of picture elements.

13. The apparatus of claim 1 wherein
said different operations include a keep operation
said keep operation retaining a picture element of said arrangement of picture elements when providing said manipulated arrangement of picture elements.

14. The apparatus of claim 1 wherein
said different operations include a dual operation
said dual operation including averaging two picture elements from said arrangement of picture elements are average to provide one pixel of said manipulated arrangement of picture elements.

15. The apparatus of claim 1 wherein
said different operations include a quad operation
said quad operation including averaging four picture elements from said arrangement of picture elements to provide one picture element of said manipulated arrangement of picture elements.

16. An apparatus for scaling an image as represented by an arrangement of picture elements, the apparatus scaling the image from a first size to a second size based upon a plurality of scaling parameters, the plurality of scaling parameters representing a secured scaling factor, the plurality of scaling parameters being integer numbers, the apparatus comprising a scaler circuit, said scaler circuit including a plurality of independent parameter counter circuits, each said parameter counter circuit receiving a perspective scaling parameter and providing a respective independent signal manipulation control signal based upon said respective scaling parameter, said scaler circuit being configured to receive an image signal representing the arrangement of picture elements, said scaler circuit being configured to manipulate the arrangement of picture elements based upon said signal manipulation control signals to provide a manipulated arrangement of picture elements, said manipulation including selectively performing a discrete number of different operations on subsets of said picture elements based upon said respective signal manipulation control signals, and said scaler circuit being configured to provide said manipulated arrangement of picture elements as a scaled image.

17. The apparatus of claim 16 wherein
said scaler circuit includes
a control circuit,
said control circuit being configured to receive said plurality of scaling parameters and to provide said signal manipulation control signals based upon said plurality of scaling parameters, said control circuit including said parameter counter circuits, and
a signal manipulation circuit,
said signal manipulation circuit being configured to manipulate said arrangement of picture elements in response to said signal manipulation control signals.

18. An apparatus for scaling an image as represented by an arrangement of picture elements, the apparatus scaling the image from a first size to a second size based upon a plurality of scaling parameters, the plurality of scaling parameters representing a desired scaling factor, the plurality of scaling parameters being integer numbers, the apparatus comprising a scaler circuit said scaler circuit being configured to receive the plurality of scaling parameters and an image signal representing the arrangement of picture elements, said scaler circuit being configured to manipulate the arrangement of picture elements based upon the plurality of scaling parameters to provide a manipulated arrangement of picture elements, said manipulation including performing a discrete number of different operations on subsets of said picture elements, said discrete number being related to the plurality of scaling parameters, and said scaler circuit being configured to provide said manipulated arrangement of picture elements as a scaled image, said scaler circuit including
a control circuit,
said control circuit being configured to receive said plurality of scaling parameters and to provide signal manipulation control signal based upon said plurality of scaling parameters, sand
a signal manipulation circuit,
said signal manipulation circuit being configured to manipulate said arrangement of picture elements in response to said signal manipulation control signals
said control circuit including
a parameter counter circuit
said parameter counter circuit being configured to receive a scaling parameter and to provide a parameter count signal and a parameter counter equals zero control signal to said parameter control signal, and
a parameter control circuit,
said parameter control circuit being configured to receive input control signals including said parameter count signal and said parameter count equals zero control signal from said parameter counter circuit as well as a timing control signal and a scaling enable signal, to provide said signal manipulation control signals based upon said input control signals and to provide said timing control signal to said parameter counter circuit.

19. The apparatus of claim 18 wherein said control circuit includes a plurality of parameter counter circuits, said plurality of parameter counter circuits providing a plurality of parameter count signals and a plurality of parameter count equals zero signals to said parameter control circuit based upon said plurality of scaling parameters and said timing control signal, and said parameter control circuit is configured to receive said plurality of parameter count signals and said plurality of parameter count equals zero signals as input control signals.

20. The apparatus of claim 19 wherein
said parameter counter circuit is a drop circuit,
said drop circuit being configured to receive a drop scaling parameter and to provide a drop count signal as well as a drop count equals zero control signal to said parameter control circuit.

21. The apparatus of claim 19 wherein
said parameter counter circuit is a keep circuit,
said keep circuit being configured to receive a keep scaling parameter and to provide a keep count signal as well as a keep count equals zero control signal to said parameter control circuit.

22. The apparatus of claim 19 wherein
said parameter counter circuit is a dual circuit,
said dual circuit being configured to receive a dual scaling parameter and to provide a dual count signal as well as a dual count equals zero control signal to said parameter control circuit.

23. The apparatus of claim 19 wherein
said parameter counter circuit is a quad circuit,
said quad circuit being configured to receive a quad scaling parameter and to provide a quad count signal as well as a quad count equals zero control signal to said parameter control circuit.

24. The apparatus of claim 17 wherein
said scaler circuit further includes
an input circuit,
said input circuit being configured to receive an image signal representing said arrangement of picture elements, and
an output circuit,
said output circuit being configured to provide said manipulated arrangement of picture elements as a scaled image signal.

25. The apparatus of claim 16 wherein
said different operations include a drop operation,
said drop operation removing a picture element from said arrangement of picture elements when providing said manipulated arrangement of picture elements.

26. The apparatus of claim 16 wherein
said different operations include a keep operation
said keep operation retaining a picture element of said arrangement of picture elements when providing said manipulated arrangement of picture elements.

27. The apparatus of claim 16 wherein
said different operations include a dual operation
said dual operation including averaging two picture elements from said arrangement of picture elements are average to provide one pixel of said manipulated arrangement of picture elements.

28. The apparatus of claim 16 wherein
said different operations include a quad operation
said quad operation including averaging four picture elements from said arrangement of picture elements to provide one picture element of said manipulated arrangement of picture elements.

* * * * *